April 5, 1949.  I. NESSON  2,466,609
EXTENSIBLE WINDSHIELD WIPER ARM
Original Filed Dec. 10, 1943
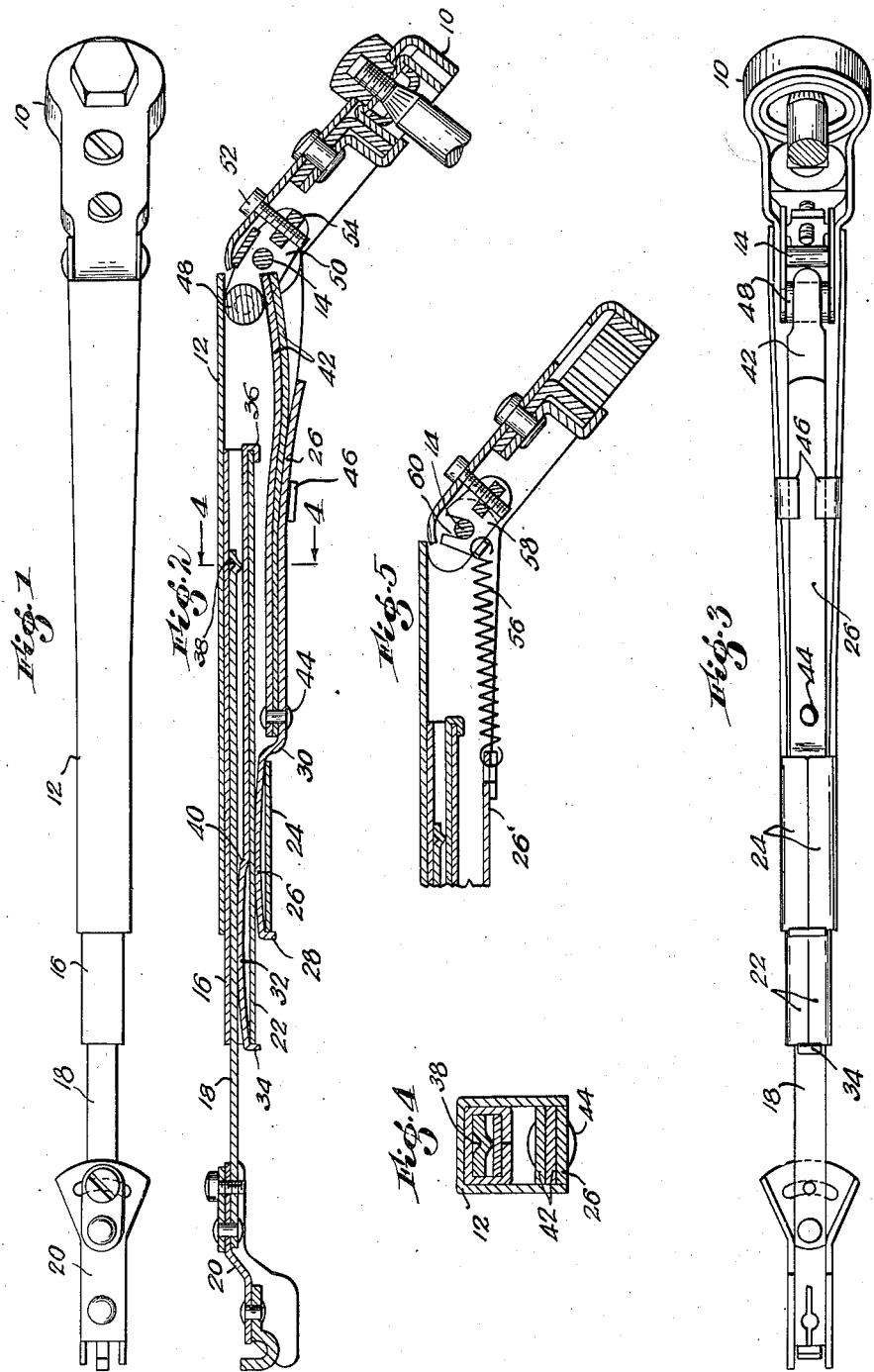
INVENTOR
ISRAEL NESSON
BY
Thomson & Thomson
ATTORNEYS Patented Apr. 5, 1949

2,466,609

UNITED STATES PATENT OFFICE 2,466,609

EXTENSIBLE WINDSHIELD WIPER ARM

Israel Nesson, Lynn, Mass., assignor to Max Zaiger, Swampscott, Mass.

Original application December 10, 1943, Serial No. 513,697. Divided and this application March 22, 1947, Serial No. 736,536

4 Claims. (Cl. 287—58)

This invention relates to windshield wiper arms and pertains more particularly to articulated, telescoping arms of the type disclosed in Zaiger Patents Nos. 2,245,244, 2,295,620 and 2,312,278.

This application is a division of my copending application Serial No. 513,697, filed December 10, 1943 and allowed August 27, 1946, for Windshield wiper arm, now Patent No. 2,417,991, dated March 25, 1947.

The principal purpose of the present invention is to improve the construction and arrangement of the telescoping extension bars, the flat spring members which retain the extension bars in adjusted relation, and the tension spring which normally urges the articulated arm body to swing at an angle with respect to the coupling member and toward the windshield with the desired degree of adjustable pressure.

The above object, and other objects will be made more apparent hereinafter, is obtained by means subsequently to be described and shown in the accompanying drawing, in which:

Fig. 1 is a plan view of the improved wiper arm;

Fig. 2 is a longitudinal section thereof;

Fig. 3 is a bottom view of the arm of Figs. 1 and 2;

Fig. 4 is an enlarged section taken on the line 4—4 of Fig. 2;

Fig. 5 is a fragmentary longitudinal section through the coupling and arm body illustrating a modified form of tension spring.

In the particular embodiment chosen for the purpose of illustrating the novelty of this invention, the improved wiper arm comprises a coupling member indicated generally at 10, a channeled arm body 12 hinged to the coupling member at the pivot 14, an intermediate channeled extension bar 16 slidable within the channeled body 12, a flat secondary extension bar 18 slidable within the channeled bar 16, and an end piece or terminal 20 disposed at the outer end of the bar 16 and adapted for attachment to a windshield wiper blade.

The telescoping action of the extension bars 16 and 18 is restrained by leaf springs which hold these bars in the adjusted positions to which they may readily be moved by hand. The intermediate extension bar 16 is box-shaped in cross section throughout its length, the bottom margins 22 of the channeled metal body being turned in against each other. The arm body 12 also has a box-shaped portion formed by the inturned bottom margins 24.

An intermediate extension bar spring 26 fits between the bottom wall 22 of the bar 16 and the bottom wall 24 of body 12, and has an end tab 28 and a shoulder 30 engaging opposite ends of said bottom wall 24, thereby to restrain relative longitudinal movement of the body 12 and spring 26 which bears against the intermediate extension bar and restrains its sliding movement.

Somewhat similarly, an extension bar spring 32 fits between the under side of the bar 18 and the bottom wall 22 of the bar 16, and has end tabs 34 and 36 engaging the opposite ends of the bottom wall 22 to hold the spring in operative position to bear against the bar 18 and restrain its sliding movement. The downwardly projecting tabs 34 and 36 also serve as stops to limit longitudinal movement of the bar 16 by engaging the spring end 28 and spring shoulder 30 respectively. Outward movement of bar 18 is limited by the engagement of a stud stop 38 of the bar with a shoulder 40 formed at the inner end of a bowed portion of spring 32, as indicated in Fig. 2.

The pivoted, telescoping arm is pressed toward the windshield on which it is mounted and normally urged to swing at an angle with respect to coupling 10, as shown in Figs. 1 to 3, by a tension spring 42 here shown as composed of two superposed leaves both secured to the inner portion of spring 26 by a rivet 44 or other fastening. Inwardly bent tabs 46 of the arm body 12 afford a fulcrum for the tension spring members, and the rearward end of tension spring 42 engages a roller 48 carried by a rocker lever having sides which receive and swing on the arm pivot 14, in the form shown in Fig. 2.

The action of the tension spring tends to swing the arm inwardly, toward the windshield, with respect to the coupling 10, and the degree of tension may be varied by providing an adjusting screw 52 which threads in a trunnion nut 54 carried by the rocker lever 50, and thus regulates the position of the lever and of its roller 48 relative to the coupling 10.

An optional form of tension spring is illustrated in Fig. 5 which shows a coiled spring 56 connected at one end to the rear end of a shortened intermediate extension bar spring 26', and connected at its other end to a modified form of rocker lever 58. In this case, the lever sides have notches 60 removably receiving the pivot pin 14, so that the rocker and spring may be applied after the arm body 12 is hinged to the coupling member 10. The position of the lever 58 may be regulated to adjust the tension of the coiled spring 56 by the screw and nut arrangement just described.

It will be realized that the coupling 10 which is shown attached to the oscillating motor shaft 56 may assume an entirely different form than that illustrated, since the coupling forms no part of the present invention. Structural variations of the arm itself, one embodiment of which has been described and illustrated in detail, are also possible within the scope and spirit of the appended claims.

I claim:

1. In a windshield wiper arm, a channeled arm body having inturned flanges forming a bottom wall portion thereof, a channeled intermediate extension bar slidable within said arm body and having inturned flanges forming a bottom wall, a flat extension bar slidable within the intermediate extension bar, a spring disposed between the bottom wall portion of the arm body and the bottom wall of the intermediate extension bar, and a spring disposed between the bottom wall of the intermediate extension bar and the flat extension bar, said springs being operative to hold the extension bars in adjusted position, the first named spring having flange and shoulder portions engaging opposite ends of the bottom wall portion of said arm body to prevent relative longitudinal displacement therebetween, and the second named spring having end flanges engaging opposite ends of the bottom wall of the intermediate extension bar to prevent relative longitudinal displacement therebetween.

2. In a windshield wiper arm, a channeled arm body having inturned flanges forming a bottom wall portion thereof, a channeled intermediate extension bar slidable within said arm body and having inturned flanges forming a bottom wall, a flat extension bar slidable within the intermediate extension bar, a spring disposed between the bottom wall portion of the arm body and the bottom wall of the intermediate extension bar, and a spring disposed between the bottom wall of the intermediate extension bar and the flat extension bar, said springs being operative to hold the extension bars in adjusted positive to hold the extension bars in adjusted position, the first named spring having flange and shoulder portions engaging opposite ends of the bottom wall portion of said arm body to prevent relative longitudinal displacement therebetween, and the second named spring having end flanges engaging opposite ends of the intermediate extension bar to prevent relative longitudinal displacement therebetween, said end flanges forming stops engageable with the flange and shoulder of the first named spring to limit longitudinal movement of the intermediate extension bar, the second named spring having a shoulder and the flat extension bar having a detent forming a stop engageable with said shoulder to limit outward movement of said flat extension bar.

3. In a windshield wiper arm, a channeled arm body having inturned flanges forming a bottom wall portion thereof, a channeled intermediate extension bar slidable within said arm body and having inturned flanges forming a bottom wall, a flat extension bar slidable within the intermediate extension bar, a spring disposed between the bottom wall portion of the arm body and the bottom wall of the intermediate extension bar, and a spring disposed between the bottom wall of the intermediate extension bar and the flat extension bar, said springs being operative to hold the extension bars in adjusted position and having means preventing their longitudinal displacement relative to the arm body and extension bar in which they are disposed, a shaft coupling member pivoted to said arm body and having a transverse abutment at its inner end, and a tension spring attached to said first named spring and engaging the abutment of said coupling member, so that the arm body is urged to angular position with respect to the coupling member.

4. In a windshield wiper arm, a channeled arm body having inturned flanges forming a bottom wall portion, an extension bar slidable within said arm body, a spring disposed between said bottom portion and said bar, said spring serving to hold the extension bar in adjusted position and having means preventing its longitudinal displacement relative to said bottom wall, a coupling for connecting the arm body to a shaft, a pin pivotally connecting the arm body to the coupling, a rocker lever pivoted on said pin and having a roller at one end, a tension spring affixed to said first named spring and engaging said roller, so that the arm body is urged to angular position with respect to the coupling and means connected to the opposite end of said rocker lever for adjusting the position of said roller with respect to said second named spring and the end of the arm body.

ISRAEL NESSON.

REFERENCES CITED

The following references are of record in the file of this patent:

UNITED STATES PATENTS

| Number | Name | Date |
| --- | --- | --- |
| 2,215,371 | Horton | Sept. 17, 1940 |
| 2,295,621 | Zaiger | Sept. 15, 1942 |